(12) United States Patent
Herberg, Jr. et al.

(10) Patent No.: US 8,792,360 B2
(45) Date of Patent: Jul. 29, 2014

(54) DUPLICATE PACKET SUPPRESSION

(75) Inventors: Ulrich Herberg, Jr., Sunnyvale, CA (US); Alvaro Cardenas, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 191 days.

(21) Appl. No.: 13/460,592

(22) Filed: Apr. 30, 2012

(65) Prior Publication Data

US 2013/0287024 A1    Oct. 31, 2013

(51) Int. Cl.
*H04L 12/28* (2006.01)
*H04L 12/56* (2006.01)

(52) U.S. Cl.
CPC .................................. *H04L 45/18* (2013.01)
USPC .......................................... 370/242; 370/389

(58) Field of Classification Search
None
See application file for complete search history.

(56) References Cited

U.S. PATENT DOCUMENTS

| | | | |
|---|---|---|---|
| 5,034,945 A * | 7/1991 | Kimoto et al. | 370/227 |
| 6,751,746 B1 | 6/2004 | Jain et al. | |
| 6,873,618 B1 * | 3/2005 | Weaver | 370/390 |
| 7,693,043 B2 | 4/2010 | Previdi et al. | |
| 7,697,416 B2 | 4/2010 | Shand et al. | |
| 7,701,845 B2 | 4/2010 | Bryant et al. | |
| 7,808,890 B2 | 10/2010 | Shand et al. | |
| 7,852,751 B2 | 12/2010 | Bryant et al. | |
| 7,864,708 B1 | 1/2011 | Bryant et al. | |
| 7,885,179 B1 | 2/2011 | Bryant et al. | |
| 7,920,566 B2 | 4/2011 | Bryant et al. | |
| 7,933,197 B2 | 4/2011 | Bryant et al. | |
| 7,957,306 B2 | 6/2011 | Bryant et al. | |
| 8,111,616 B2 | 2/2012 | Shand et al. | |
| 2003/0231596 A1 | 12/2003 | Hong | |
| 2005/0018668 A1 | 1/2005 | Cheriton | |
| 2009/0067322 A1 | 3/2009 | Shand et al. | |
| 2010/0238866 A1 | 9/2010 | Sendrowicz | |
| 2010/0303091 A1 | 12/2010 | Bryant et al. | |

FOREIGN PATENT DOCUMENTS

| | | |
|---|---|---|
| JP | 4820464 B2 | 11/2011 |
| WO | 2011/013165 A1 | 2/2011 |

OTHER PUBLICATIONS

Chakeres, "Duplicate Packet Detection for Multicast: Methods, Analysis and Relative Performance" IEEE Wireless Communications and Networking Conference, 2008, pp. 2798-2803.

Whitaker et al., "Forwarding without loops in Icarus" IEEE Open Architectures and Network Programming Proceedings, 2002, pp. 63-75.

U. Herber et al. "Depth-First Forwarding in Unreliable Networks draft-cardenas-dff-05" Mar. 26, 2012, Internet Engineering Task Force, http://tools.ietf.org/html/draft-cardenas-dff-05, p. 1-30.

Rachel Albright, "Cisco's Statement of IPR Related to draft-ietf-rtgwg-ipfrr-notvia-addresses-08", Submitted Jun. 4, 2012.

European Search Report dated Aug. 8, 2013 in application No. 13164635.8.

* cited by examiner

*Primary Examiner* — Kevin C Harper
(74) *Attorney, Agent, or Firm* — Maschoff Brennan

(57) ABSTRACT

According to an aspect of an embodiment, a method of managing packets in a communication network including multiple communication nodes is described. The method may include receiving a packet including a packet header. The packet header may include a packet identifier uniquely identifying the packet. The method may also include determining a packet type of the packet received by a first communication node based on the packet identifier. The method may also include dropping the packet when the packet is determined to be a duplicate packet or routing the packet to a neighbor communication node in a manner that prevents the packet from being caught in a loop when the packet is determined to be a returned packet or a new packet.

20 Claims, 5 Drawing Sheets

DUPLICATE PACKET SUPPRESSION

FIELD

The embodiments discussed herein are related to packet management in a communication network.

BACKGROUND

Links in some communication networks are lossy, meaning that some data packets may be lost during transmission. Various mechanisms exist to acknowledge receipt of a data packet. For example, a link-layer acknowledgment (ACK) mechanism may be provided in such communication networks in which a receiving communication node may send a sending communication node an ACK message to acknowledge receipt of a data packet. However, the ACK messages may also be lost.

Various multi-path data forwarding protocols exist to improve reliability in lossy communication networks. In communication networks that implement such multi-path data forwarding protocols, a first node may send a data packet to a second node along a first route or path. If the first node does not receive an ACK message from the second node, the first node may resend the data packet to a third node along a different route or path. In some cases, the packet sent to the second node may have successfully arrived at the second node to be forwarded to yet another node, even though the first node may have not received an ACK message from the second node. In this example, the resent packet that is sent to the third node is a duplicate of the packet sent to and forwarded by the second node. Existing multi-path data forwarding protocols are unable to reliably detect duplicate packets and/or discern duplicate packets from looped packets such that duplicate packets may increase congestion in a communication network and/or routes may not be poisoned or updated to prevent loops.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of managing packets in a communication network including multiple communication nodes is described. The method may include receiving a packet including a packet header. The packet header may include a packet identifier uniquely identifying the packet. The method may also include determining a packet type of the packet received by a first communication node based on the packet identifier. The method may also include dropping the packet when the packet is determined to be a duplicate packet or routing the packet to a neighbor communication node in a manner that prevents the packet from being caught in a loop when the packet is determined to be a returned packet or a new packet.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Embodiments of the present invention will be explained with reference to the accompanying drawings.

Figure 1:
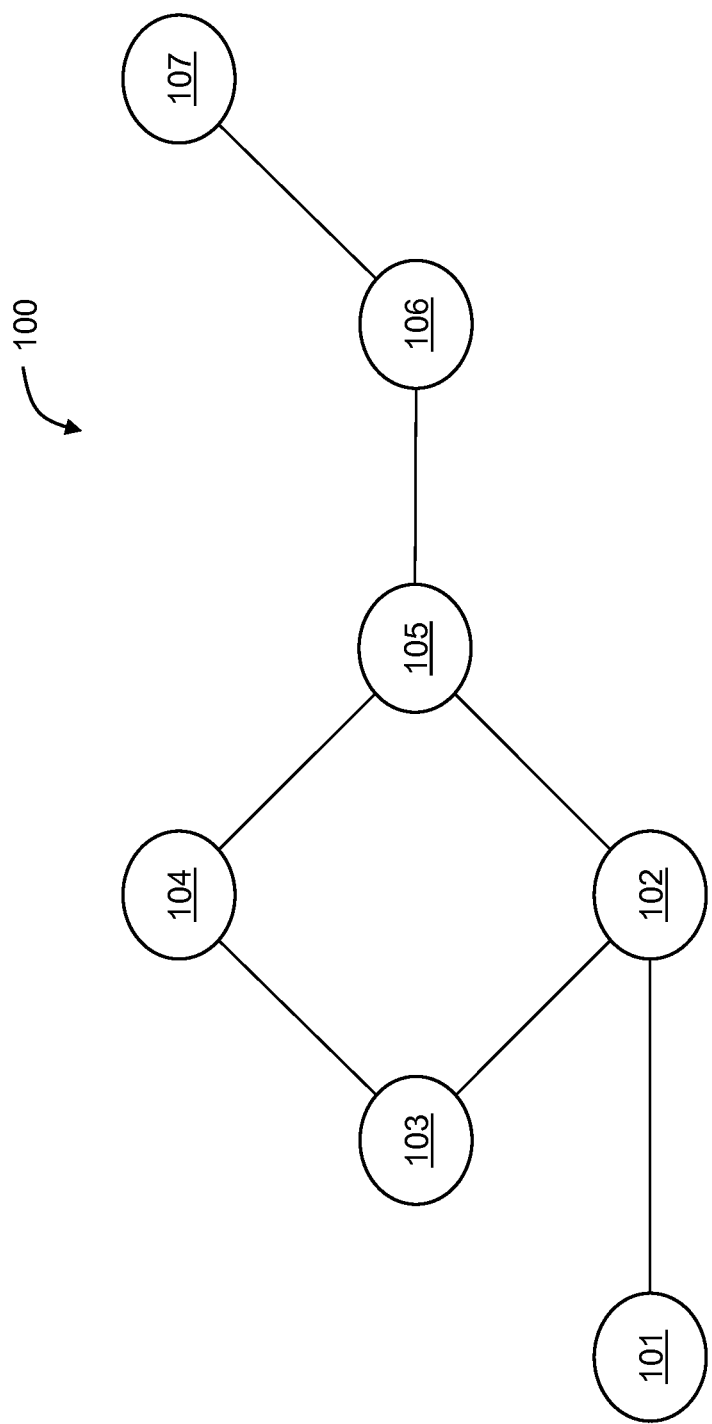
FIG. 1 illustrates an example communication network in which packets may be transmitted.

FIG. 1 illustrates an example communication network 100 in which packets may be transmitted, arranged in accordance with at least some embodiments described herein. The communication network 100 includes multiple communication nodes (hereinafter "nodes") 101-107 communicatively coupled together via communication media (not labeled).

The communication media may include any media suitable for carrying electrical, optical, and/or wireless data signals. For example, the communication media may include, but are not limited to, wires, optical fibers, wireless channels, or other suitable communication media.

The communication network 100 may have any suitable network topology. The "network topology" generally describes how the nodes 101-107 in the communication network 100 are interconnected. Example network topologies include, but are not limited to, ring, hub and spoke, and mesh topologies, or any combination thereof. Accordingly, the network topology illustrated in FIG. 1 is provided by way of example only and should not be construed to limit the invention.

In some embodiments, the communication network 100 may include multiple paths between the nodes 101-107 for redundancy. For instance, as illustrated in FIG. 1, two paths exist between the node 101 and the node 107. In particular, one path between the node 101 and the node 107 includes the nodes 102, 103, 104, 105 and 106. A relatively shorter path between the node 101 and the node 107 includes the nodes 102, 105 and 106. The redundancy may provide failure tolerance. For instance, if a communication link between the node 102 and the node 105 fails, data sent from the node 101 and intended for the node 107 may be sent to the node 107 along the relatively longer path including the nodes 102, 103, 104, 105 and 106 to circumvent the failed communication link.

Each of the nodes 101-107 may have at least one neighbor node 101-107. A "neighbor node" as used herein may refer to a node that is coupled to another node without any intervening nodes. For example, the node 102 includes three neighbor nodes, including nodes 101, 103 and 105. Additionally, while FIG. 1 illustrates seven nodes 101-107, more generally, the communication network 100 may include virtually any number of nodes 101-107, including less than seven nodes or more than seven nodes. Alternately or additionally, each of the nodes 101-107 may include a router, switch, or other communication node. Moreover, in some embodiments, each of the nodes 101-107 may have a unique node identifier.

The nodes 101-107 may be configured to exchange data with other nodes 101-107 in the communication network 100. For instance, any one of the nodes 101-107 may be configured to send data to another one of the nodes 101-107, and the other one of the nodes 101-107 may be configured to receive the data. The node 101-107 from which the data originates may be referred to as a source node and the node 101-107 to which the data is addressed may be referred to as a destination node.

When the source node and the destination node are not neighbor nodes, the data may be forwarded by one or more intervening nodes before reaching the destination node. In particular, if a given one of the nodes 101-107 receives data identifying a different one of the nodes 101-107 as the destination node, the given one of the nodes may forward the data to another one of the nodes 101-107. Each intervening node may be referred to as a "hop" in a travel path of the data. As already mentioned above, sometimes there may be multiple paths between any given pair of source and destination nodes and the intervening nodes may attempt to forward data over one path at a time, rather than all paths at once, to minimize bandwidth requirements in the communication network 100.

The data may be packetized for transmission as packets from source node to destination node. Different packets from the same source node may be discerned by a packet identifier associated with each packet as discussed in greater detail below. An example of a packet including a packet identifier will now be described with respect to FIG. 2.

Figure 2:
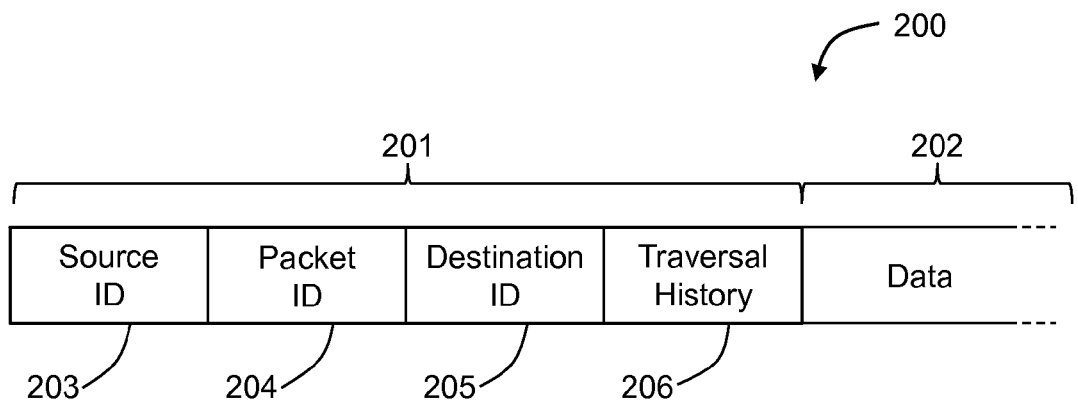
FIG. 2 illustrates an example packet that may be transmitted through the communication network of FIG. 1.

FIG. 2 illustrates an example packet 200 that may be transmitted through the communication network 100 of FIG. 1, arranged in accordance with at least some embodiments described herein. As illustrated in FIG. 2, the packet 200 may include a header 201 and a payload 202.

With combined reference to FIGS. 1 and 2, the header 201 may include information for handling the packet 200 within the communication network 100. For instance, the header 201 may include a source identifier (ID) 203, a packet ID 204, a destination ID 205, and/or a traversal history 206.

The source ID 203 may identify a particular one of the nodes 101-107 as the source node from which the packet 200 originates. The source ID 203 may include, but is not limited to, the node identifier of the source node, an Internet Protocol (IP) address of the source node, a Media Access Control (MAC) address of the source node, or the like or any combination thereof.

The packet ID 204 may uniquely identify the packet 200 such that the packet 200 may be discerned from other packets that originate from the same source node. The packet ID 204 may include, but is not limited to, a unique sequence number assigned to the packet 200 by the source node of the packet 200, a timestamp such as a timestamp indicating a departure time of the packet from the source node, a hash value, or any combination thereof.

The destination ID 205 may identify an intended destination node of the packet 200. The destination ID 205 may include, for example, the node identifier of the destination node, an IP address of the destination node, a MAC address of the destination node, or the like or any combination thereof.

The traversal history 206 may be configured to identify a set of communication nodes that have previously forwarded the packet 200. The traversal history 206 may include, but is not limited to, a list of node identifiers corresponding to nodes 101-107 that have forwarded the packet 200, a Bloom filter, or the like. When the packet 200 first leaves the source node, the traversal history 206 may be empty in some embodiments. However, each node that forwards the packet 200 on to another node may update the traversal history to include a node identifier of the corresponding node as described in more detail below.

The header 201 generally includes information for handling and routing the packet 200 within the communication network 100. In contrast, the payload 202 includes the data that is being routed from source node to destination node within the communication network 100. The payload 202 of the packet 200 is illustrated in a truncated form in FIG. 2 and is relatively small, as illustrated, in comparison to the header 201. Generally, however, a packet payload may occupy a majority of a given packet, with a corresponding header occupying only a relatively small portion of the given packet.

Returning to FIG. 1, and according to some embodiments, communication links between the nodes 101-107 may be lossy, meaning that some packets may get lost before reaching a corresponding destination node. A communication protocol implemented by the nodes 101-107 may include any one or more of various mechanisms to acknowledge receipt of a data packet. For example, a link-layer acknowledgment (ACK) mechanism may be implemented in which a receiving node sends an ACK message to a sender node in response to receiving a packet from the sender node. However, similar to the packets themselves, ACK messages and/or other acknowledgment messages may also be lost, thus limiting the effectiveness of the ACK mechanism and/or other acknowledgment mechanism.

Accordingly, the nodes 101-107 may implement a multi-path routing protocol in which the nodes 101-107 resend packets via alternate paths when ACK messages are not received for packets sent via a given path. For example, if the node 102 receives a packet from the node 101 as the source node and identifying the node 107 as the destination node, the node 102 may first attempt to forward the packet to the node 107 via the relatively shorter path including the nodes 105 and 106. If the node 102 does not receive an ACK message from the node 105 after sending the packet to the node 105 and, for example, after a specified time period has elapsed, the node 102 may resend the packet to the node 107 along the relatively longer path including the nodes 103, 104, 105 and 106.

Because some ACK messages may be lost, it may be the case that the packet first sent from the node 102 to the node 105 may arrive at the node 105, even though the node 102 may not receive an ACK message from the node 105 confirming arrival of the packet. In this example, if the node 102 resends the packet via an alternate path, e.g., via the nodes 103 and 104, the resent packet is considered a "duplicate packet" since it is duplicative of another packet in the communication network 100, e.g., the packet that has already successfully arrived at the node 105. Duplicate packets congest communication networks and are generally undesirable.

Duplicate packets are one type of packet. Other types of packets include new packets, returned packets and looped packets. A new packet includes a packet containing data which has not previously been received or forwarded by a given one of the nodes 101-107. A returned packet includes a packet that has been deliberately returned to a previous hop/node because the packet has reached a dead end in the path it was traveling. By returning the packet to the previous hop, the previous hop may attempt to forward the packet towards its intended destination through an alternate path. A looped packet includes a packet that is forwarded to a node that has already forwarded the packet before and which has not been returned to the node on purpose. Loops in communication networks are generally undesirable.

Some embodiments described herein may identify duplicate packets, returned packets and new packets based on information included in packet headers, such as the packet ID 204 and/or the traversal history 206. Duplicate packets may be dropped while new packets and returned packets may be routed so as to prevent loops as described herein.

By way of example, the node 102 may forward a packet with a given packet ID to the node 105 and, in response to not receiving an ACK message from the node 105, may then forward a copy of the packet to the node 103, which forwards the copy of the packet to the node 104, which forwards the copy of the packet to the node 105. Both the packet and the copy of the packet may include the same packet ID.

If both the packet and the copy of the packet eventually reach the node 105, the one that is received first may be considered by the node 105 as a new packet, while the one that is received second may be considered by the node 105 as a duplicate packet. For instance, if the packet is received by the node 105 before the copy of the packet, the node 105 may analyze the header of the packet to determine that the packet is a new packet by determining that the node 105 has not previously received any packets having the packet ID contained in the header of the packet. The node 105 may then forward the packet and update a record of packet IDs of packets that haven been received and forwarded by the node 105 to include the packet ID of the forwarded packet. The header of the subsequently received copy of the packet may be analyzed by the node 105 to determine that the copy of the packet is a duplicate packet with respect to the previously received packet by comparing the packet ID in the header of the copy of the packet to the record of packet IDs.

If, however, the copy of the packet is received by the node 105 before the packet, the node 105 may analyze the header of the copy of the packet to determine that the copy of the packet is a new packet and may then forward the copy of the packet and update the record of packet IDs to include the packet ID of the copy of the packet. The header of the subsequently received packet may be analyzed to determine that the packet is a duplicate packet with respect to the previously received copy of the packet.

The identified duplicate packet, whether it be the packet received directly from the node 102 or the copy of the packet forwarded through the node 103 and the node 104, may then be dropped. Dropping the duplicate packet may include removing the duplicate packet from circulation within the communication network 100, e.g., by not forwarding the duplicate packet, prior to the duplicate packet reaching a destination node specified in the packet header.

As mentioned previously, a looped packet includes a packet that is forwarded to a node that has already forwarded the packet before and which has not been returned to the node on purpose. By way of example, the node 102 may forward to the node 103 a packet that identifies the node 107 as the destination node. The node 103 may forward the packet to the node 104, which may then forward the packet to the node 105. If the node 105 forwards the packet to the node 102, the packet becomes a looped packet. Loops may be avoided according to some embodiments based on the traversal history that may be included in the packet header.

For instance, each node that forwards the packet may update the traversal history of the packet to identify the forwarding node. Thus, continuing with the previous example, prior to forwarding the packet back to the node 102, the node 105 may analyze the traversal history of the packet to determine whether one or more of its neighbor nodes, including the nodes 102, 104 and 106, have previously forwarded the packet. In response to determining that the nodes 102 and 104 have previously forwarded the packet and the node 106 has not previously forwarded the packet, the node 105 may forward the packet to the node 106 and thereby avoid creating a loop.

A returned packet may include a packet that has been deliberately returned to a previous hop/node because the packet has reached a dead end in the path it was traveling. For example, the node 103 as a source node may generate a packet intended for the node 107 as a destination node. The node 103 may send the packet to the node 102. In response to receiving the packet, the node 102 may update its record of packet IDs to include a packet ID of the packet, may update the traversal history of the packet to include the node identifier of the node 102, and may then forward the packet to the node 101. The node 101 may then return the packet to the node 102 as the node 101 is a dead end in terms of getting the packet to the node 107 in the illustrated embodiment. After the node 102 receives the returned packet, the node 102 may determine, based on the packet ID and the traversal history of the packet, that the node 102 has previously received and forwarded the packet such that the packet is a returned packet. The node 102 may then attempt to forward the packet to the node 107 without creating a loop as described herein, such as by forwarding the packet to the node 105.

Figure 3:
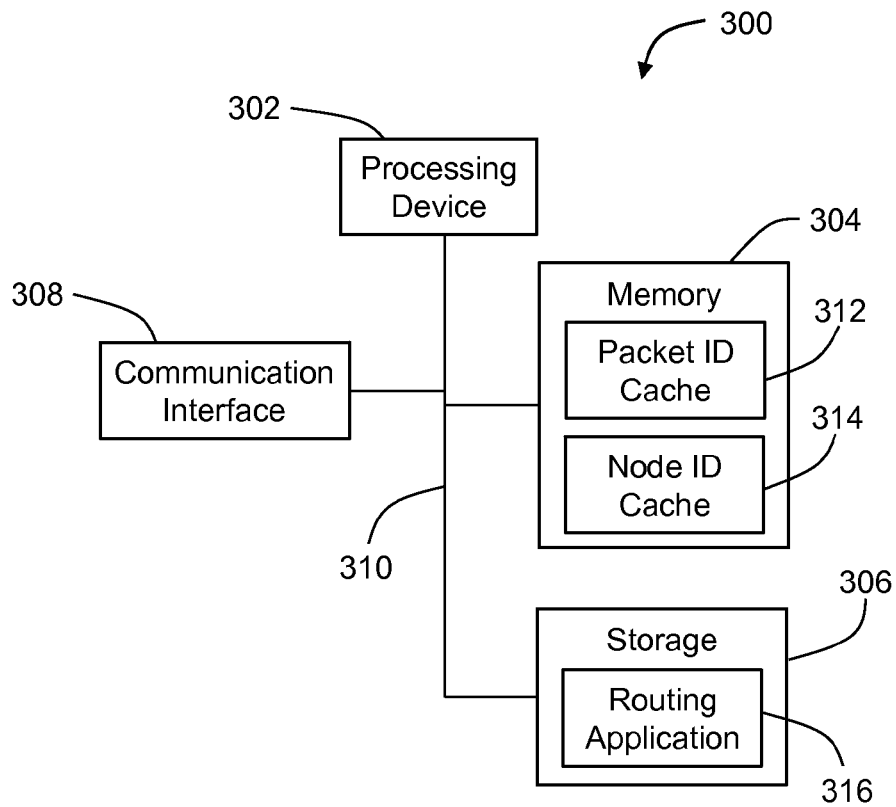
FIG. 3 is a block diagram of an example communication node that may be included in the communication network of FIG. 1.

FIG. 3 is a block diagram of an example node 300 that may be included in the communication network 100 of FIG. 1, arranged in accordance with at least some embodiments described herein. The node 300 may correspond to any of the nodes 101-107 of FIG. 1, for example. As illustrated in FIG. 3, the node 300 may include a processing device 302 and one or more computer-readable storage media, such as a memory 304 and storage 306. The node 300 may further include a communication interface 308.

The processing device 302, the memory 304, the storage 306 and the communication interface 308 may be communicatively coupled via a communication bus 310. The communication bus 310 may include, but is not limited to, a memory bus, a storage interface bus, a bus/interface controller, an interface bus, or the like or any combination thereof.

The processing device 302 may be configured to perform one or more of the methods or operations described herein, such as methods of managing packets in a communication network as described below with respect to FIGS. 5 and 6. The processing device 302 may be configured to perform such methods or operations by executing computer instructions—also sometimes referred to as computer-executable instructions and/or computer-readable instructions—loaded into the memory 304 or stored in the storage 306. The processing device 302 may include, but is not limited to, a processor, microprocessor, controller, microcontroller, central processing unit (CPU), or other suitable processing device.

The memory 304 may include volatile storage such as random access memory (RAM) or other volatile storage. The memory 304 may include a packet ID cache 312 and a node ID cache 314.

The packet ID cache 312 may include a record of packet IDs of packets that have been received and forwarded by the node 300 to other nodes. The packet ID cache 312 may be used by the node 300 after a packet is received to determine, based on a packet ID of the packet, whether the node 300 has previously received and forwarded any packets with the same packet ID. The determination may additionally be based on a source ID of the packet, in which case the packet ID cache 312 may additionally include source IDs of the packets it has previously received and forwarded, and/or the packet IDs in the packet ID cache 312 may be indexed or otherwise organized by corresponding source ID.

The node ID cache 314 may include a node identifier of the node 300 and/or a node identifier of each neighbor node of the node 300. Alternately or additionally, the node ID cache 314 may include k known hash functions associated with a Bloom filter used for a traversal history included in packets received by the node 300. The node ID cache 314 may be used by the node 300 after a packet is received to determine, based on a traversal history of the packet, whether the node 300 has previously forwarded the particular packet, and not merely whether the node 300 has previously forwarded a packet including the same packet ID as the particular packet.

The storage 306 may include non-volatile storage such as, but not limited to, read only memory (ROM), electrically erasable and programmable read only memory (EEPROM), solid state storage devices, optical storage devices, magnetic storage devices, or other suitable non-volatile storage. In the illustrated embodiment of FIG. 3, the storage 306 includes a routing application 316. The routing application 316 may include computer instructions that are executable by the processing device 302 to perform some or all of the methods and/or operations described herein. In some embodiments, the routing application 316 may be loaded into the memory 304 before being executed by the processing device 302, and/or the routing application 316 may be executed by the processing device 302 line-by-line from the storage 306 without being loaded into the memory 304. Alternately or additionally, copies of one or both of the packet ID cache 312 and the node ID cache 312 may be stored in the storage 306.

The communication interface 308 may be configured to facilitate communications with one or more other nodes over a communication link. The communication interface 308 may include, but is not limited to, a network interface card, a network adapter, a local area network (LAN) adapter, or other suitable communication interface.

Figure 4:
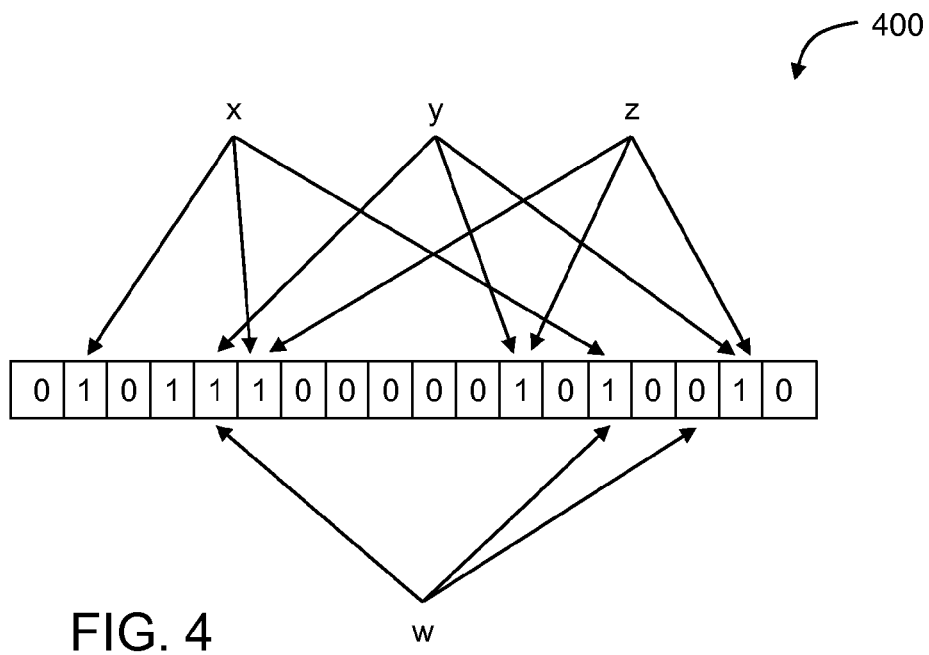
FIG. 4 conceptually illustrates an example Bloom filter that may be included in a packet header of a packet.

FIG. 4 conceptually illustrates an example Bloom filter 400 that may be included in a packet header of a packet, arranged in accordance with at least some embodiments described herein. The Bloom filter 400 may be included in the packet header of the packet as a traversal history of the packet, for example, and may be configured to identify a set of communication nodes that have previously forwarded the packet as generally described above with respect to the traversal history 206 of the packet 200 of FIG. 2.

In these and other embodiments, the Bloom filter 400 may generally include a bit sequence or array of n bits that may be used to test whether an element is a member of a set. In the example of FIG. 4, n is eighteen, and the Bloom filter 400 may specifically be used as a traversal history in a packet to determine whether a given node is a member of a set of nodes that have previously forwarded the packet. Elements, or nodes in this case, may be added to the set, but not removed from the set.

Initially, each of m bits or array positions in the Bloom filter 400 may be set to zero. The Bloom filter 400 may have associated therewith k different hash functions, each of which maps—or hashes—a node, or uniquely identifying data associated with each node, to a corresponding one of the m array positions with a uniform random distribution in some embodiments. The k resulting array positions may then be set to one. In the example of FIG. 4, k is three and the k different hash functions may be applied to a node identifier of a given node to add the given node, or more particularly to add the node identifier of the given node, to the Bloom filter 400.

In more detail, and with respect to FIG. 4, for example, three elements x, y, z are identified in the Bloom filter 400. Three hash functions k may be applied to node identifiers of each of the three elements x, y, z to map each of the three node identifiers to three corresponding array positions as illustrated in FIG. 4. The three array positions corresponding to each identifier have been set to one in the illustrated embodiment.

To query the Bloom filter 400 for the inclusion of a node identifier corresponding to a node w, e.g., to test whether the node w is a member of the set of nodes x, y, z that have forwarded the corresponding packet, the three hash functions k may be applied to the node identifier of the node w to obtain three corresponding array positions, each of which is indicated in FIG. 4. It may be seen from FIG. 4 that each of the first two array positions corresponding to the node w is set to one while the third array position is set to zero. Because the third array position corresponding to the node w is set to zero, the node identifier of the node w has not been added to the Bloom filter 400 such that the node w is not a member of the set of nodes that have forwarded the corresponding packet. More generally, anytime any array position in the Bloom filter 400 corresponding to a given node or node identifier is set to zero rather than one, even if up to all of the other array positions corresponding to the given node or node identifier are set to one, it may be determined that the given node is not a member of the set of nodes that have previously forwarded the corresponding packet.

Figure 5:
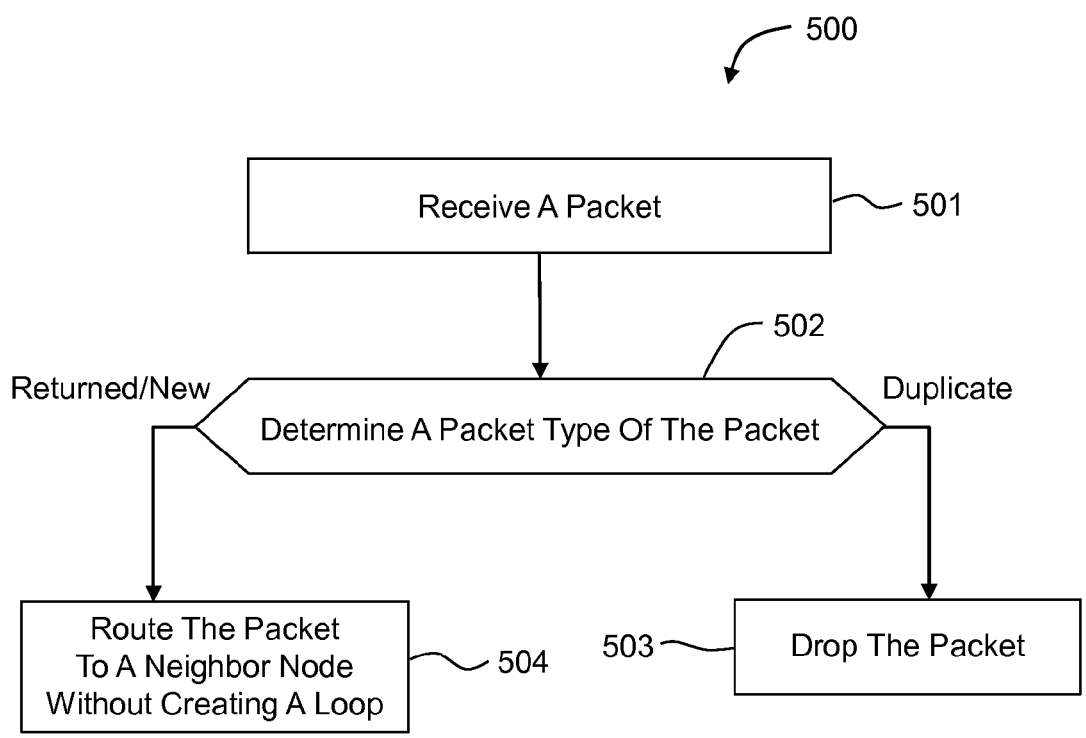
FIG. 5 is a flow diagram of an example method of managing packets in the communication network of FIG. 1.

FIG. 5 is a flow diagram of an example method 500 of managing packets in the communication network of FIG. 1, arranged in accordance with at least some embodiments described herein. The method 500 may be implemented in some embodiments, in whole or in part, by one or more communication nodes of a communication network, such as one or more of the nodes 101-107 of the communication network 100 of FIG. 1 and/or the node 300 of FIG. 3. For simplicity, the method 500 will be discussed as being performed by a first communication node ("first node"). The method 500 may have one or more steps, acts, or operations, as illustrated by one or more of blocks 501-504.

In block 501, a packet is received. For instance, the packet may be received by the first node from another node. The packet may include a packet header, such as the header 201 of FIG. 2. The packet header may include a packet ID, such as the packet ID 204 of FIG. 2, that uniquely identifies the packet.

In block 502, a packet type of the packet received by the first node may be determined based on the packet ID of the packet. The packet type may include, for example, duplicate, returned, or new such that determining a packet type of the packet may include determining whether the packet is a duplicate packet, a returned packet, or a new packet.

Determining a packet type of the packet based on the packet ID may include: comparing the packet ID to a list of packet identifiers corresponding to packets received at the first node; determining whether another packet having a same packet ID as the packet has been received at the first node based on the comparing; and determining whether the first node has forwarded the packet based on a traversal history included in the packet header when it is determined that another packet having a same packet identifier as the packet has been received at the first communication node. In these and other embodiments, the traversal history may include a list or a Bloom filter configured to identify a set of communication nodes that have forwarded the packet.

Alternately or additionally, determining a packet type of the packet based on the packet identifier may include determining that the packet has not been received previously at the first node based on the packet identifier.

Returning to FIG. 5, in block 503 the packet may be dropped when the packet is determined to be a duplicate packet. As previously described, dropping the duplicate packet may include removing the duplicate packet from circulation within the communication network prior to the duplicate packet reaching a destination node specified in the packet header.

Alternately, in block 504 the packet may be routed to a neighbor node in a manner that prevents the packet from being caught in a loop when the packet is determined to be a returned packet or a new packet. Routing the packet to a neighbor node in a manner that prevents the packet from being caught in a loop may include: selecting a second node to which to forward the packet from a set of neighbor nodes of the first node; determining whether the second node has forwarded the packet based on a traversal history included in the packet header; and one of: forwarding the packet to the second node when it is determined that the second node has not forwarded the packet; or selecting an alternate neighbor node to which to forward the packet when it is determined that the second node has forwarded the packet. Determining whether the second node has previously forwarded the packet based on the traversal history may include determining whether a node identifier of the second node is included in the traversal history of the packet in a similar manner in which it may be determined whether a node identifier of the first node is included in the traversal history as described herein.

More generally, routing a packet to a neighbor node in a manner that prevents the packet from being caught in a loop may include determining that the neighbor node has not forwarded the packet based on a traversal history of the packet; and forwarding the packet to the neighbor node.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, when it is determined that the packet is a new packet, the method 500 may further include updating the traversal history to include a node identifier of the first node prior to forwarding the packet to the neighbor node. In this and other embodiments, the method 500 may additionally include: selecting a different neighbor node to which to forward the packet; determining that the different neighbor node has previously forwarded the packet based on the traversal history; selecting instead the neighbor node to which to forward the packet in response to determining that the different neighbor node has previously forwarded the packet; and determining that the neighbor node has not previously forwarded the packet based on the traversal history.

In some embodiments in which the method 500 includes updating the traversal history of a new packet, the traversal history may include a Bloom filter. In this and other embodiments, updating the traversal history to include a node identifier of the first node may include calculating k known hash functions associated with the Bloom filter over a node identifier of the first node to determine k corresponding array positions in the Bloom filter. A bit in each of the k corresponding array positions in the Bloom filter may then be set to one when not already set to one.

In other embodiments in which the method 500 includes updating the traversal history of a new packet, the traversal history may include a list of node identifiers corresponding to nodes that have forwarded the new packet. In this and other embodiments, updating the traversal history to include a node identifier of the first node may include adding the node identifier of the first node to the list of node identifiers of the new packet before forwarding the new packet.

As another example, in some embodiments, the determination of the packet type may be based on both the packet ID of the packet and packet IDs of previously received packets. The packet IDs of previously received packets may be stored in a computer-readable storage medium, such as in the memory 304 and/or the storage 306 of FIG. 3. The packet IDs may be stored in the computer-readable storage medium in the form of a packet ID cache, such as the packet ID cache 312 of FIG. 3, for example. In these and other embodiments, determining a packet type of a packet may include: comparing the packet ID of the packet to the packet IDs; determining whether another packet having a same packet ID as the packet has been received at the first node based on the comparing; and determining whether the first node has forwarded the packet based on a traversal history included in the packet header of the packet when it is determined that another packet having a same packet identifier as the packet has been received at the corresponding communication node.

In some embodiments, the traversal history may include a Bloom filter. In these and other embodiments, determining the packet type of the packet may include determining that a node identifier of the first node is absent from the Bloom filter when the packet is determined to be a duplicate packet, including: calculating k known hash functions associated with the Bloom filter over the node identifier to determine k corresponding array positions in the Bloom filter; checking whether the k corresponding array positions in the Bloom filter include a one bit or a zero bit; and determining that the node identifier is absent from the Bloom filter when at least one of the k corresponding array positions includes a zero bit.

In other embodiments, the traversal history may include a list of node identifiers corresponding to communication nodes that have forwarded the packet. In this and other embodiments, determining the packet type of the packet may include determining that the node identifier of the first node is absent from the list of node identifiers when the packet is determined to be a duplicate packet.

Figure 6:
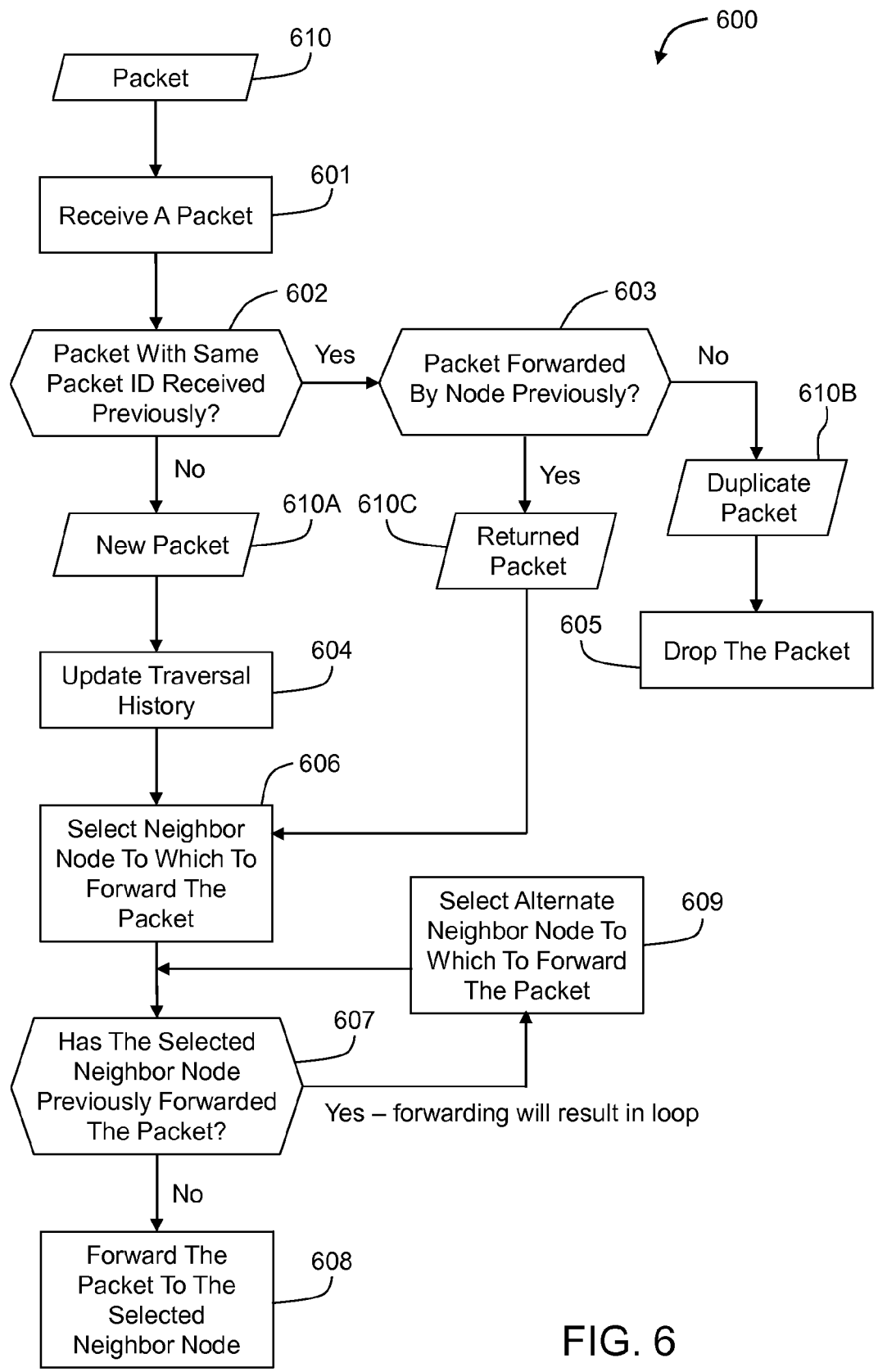
FIG. 6 is a flow diagram of another example method of managing packets in the communication network of FIG. 1.

FIG. 6 is a flow diagram of another example method 600 of managing packets in the communication network of FIG. 1, arranged in accordance with at least some embodiments described herein. The method 600 may be implemented in some embodiments, in whole or in part, by one or more communication nodes of a communication network, such as one or more of the nodes 101-107 of the communication network 100 of FIG. 1 and/or the node 300 of FIG. 3. For simplicity, the method 600 will be discussed as being performed by the node 300 of FIG. 3. More particularly, however, some or all of the method 600 may be performed by the processing device 302 of the node 300. The method 600 may have one or more steps, acts, or operations, as illustrated by one or more of blocks 601-609.

With combined reference to FIGS. 3 and 6, in block 601, a packet 610 is received. Block 601 of FIG. 6 may generally correspond to block 501 of FIG. 5. The packet may be received by the node 300 from another node. The packet may include a packet header, such as the header 201 of FIG. 2. The packet header may include a packet ID, such as the packet ID 204 of FIG. 2, that uniquely identifies the packet.

In blocks 602 and 603, the node 300 may determine a packet type of the packet 610 based on the packet ID of the received packet 610. One or more of blocks 602 and 603 may generally correspond to block 502 of FIG. 5.

In particular, at block 602, the node 300 may determine whether another packet with a same packet ID as the packet 610 has been received by the node 300 previously. For example, the node 300 may compare the packet ID of the packet 610 to the packet ID cache 312 and search for a match. If another packet with a same packet ID as the packet 610 has not been received by the node 300, the node 300 may determine at block 602 that the packet 610 is a new packet 610A and may update a traversal history included in the packet header of the packet at block 604.

Alternately, if it is determined at block 602 that another packet with a same packet ID as the packet 610 has been received by the node 300, the node 300 may determine in block 603 whether the packet 610 has been forwarded by the node 300. The determination of block 603 may be based on a traversal history of the packet 610. For example, the node 300 may compare a node identifier of the node 300 to the traversal history of the packet 610 to determine whether the node 300 has forwarded the packet 610 based on whether the node identifier of the node 300 is included in the traversal history. The specific details of the determination of block 603 may differ depending on whether the traversal history includes a Bloom filter or a list of node identifiers corresponding to nodes that have previously forwarded the packet 610.

If it is determined at block 603 that the node 300 has not forwarded the packet 610, the node 300 may determine that the packet 610 is a duplicate packet 610B and may drop the duplicate packet 610B in block 605. Block 605 may generally correspond to block 503 of FIG. 5.

On the other hand, if it is determined at block 603 that the node 300 has previously forwarded the packet 610, the node 300 may determine that the packet 610 is a returned packet 610B.

In blocks 606-609, and when it is determined that the packet 610 is the new packet 610A or the returned packet 610C (hereinafter generically "packet 610A/610C"), the node 300 may route the packet 610A/610C to a neighbor node in a manner that prevents the packet 610A/610C from being caught in a loop. One or more of blocks 606-609 may generally correspond to block 504 of FIG. 5.

In more detail, at block 606, the node 300 may select a neighbor node to which to forward the packet 610A/610C.

In block 607, the node 300 may determine whether the selected neighbor node has forwarded the packet 610A/610C. Determining whether the selected neighbor node has forwarded the packet 610A/610C may include determining whether a node identifier of the selected neighbor node is included in the traversal history of the packet. It may be determined that the selected neighbor node has not forwarded the packet 610A/610C when it is determined that the node identifier of the selected neighbor node is not included in the traversal history of the packet. It may be determined that the selected neighbor node has previously forwarded the packet 610A/610C when it is determined that the node identifier of the selected neighbor node is included in the traversal history of the packet.

In block 608, when it is determined that the selected neighbor node has not forwarded the packet 610A/610C, the node 300 may forward the packet 610A/610C to the selected neighbor node.

Alternately, a determination at block 607 that the selected neighbor node has previously forwarded the packet 610A/610C may indicate that forwarding the packet 610A/610C to the selected neighbor node will result in a loop. Thus, in block 609, the node 300 may select an alternate neighbor node to which to forward the packet and the method 600 may return to block 607.

Some embodiments disclosed herein include a computer-readable storage medium having computer instructions stored thereon that are executable by a processor or processing device to perform operations included in one or more of the methods 500 and 600 of FIGS. 5-6, such as the operations illustrated by one or more of blocks 501-504 in FIG. 5, the operations illustrated by one or more of blocks 601-609 in FIG. 6, and/or variations thereof. The computer-readable storage medium may be included in the memory 304 and/or the storage 306 of FIG. 3, for example. Alternately or additionally, the processor or processing device that performs the operations may include the processing device 302 of FIG. 3.

Some embodiments disclosed herein include a processor configured to execute computer instructions to cause a node to perform operations included in one or more of the methods 500 and 600 of FIGS. 5-6, such as the operations illustrated by one or more of blocks 501-504 in FIG. 5, the operations illustrated by one or more of blocks 601-609 in FIG. 6, and/or variations thereof. The processor, computer instructions, and node may respectively correspond to the processing device 302, the routing application 316 and the node 300 of FIG. 3, for instance.

Some embodiments disclosed herein include a system of managing packets in a communication network. The system may include multiple nodes included in the communication network. Each node may include a computer-readable storage medium configured to store thereon multiple packet IDs, each packet ID uniquely identifying a corresponding packet received by the corresponding node. Each node may include a processing device configured to manage packets in the communication network by, for a given packet, performing operations included in one or more of the methods 500 and 600 of FIGS. 5-6, such as the operations illustrated by one or more of blocks 501-504 in FIG. 5, the operations illustrated by one or more of blocks 601-609 in FIG. 6, and/or variations thereof. The communication network may correspond to the communication network 100 of FIG. 1 and the nodes may correspond to the nodes 101-107 and/or 300 of FIGS. 1 and 3. The computer-readable storage medium may correspond to the memory 304 and/or the storage 306 of FIG. 3. The multiple packet IDs stored on the computer-readable storage medium may be included in the packet ID cache 312 of FIG. 3. The processing device may correspond to the processing device 302 of FIG. 3.

Figure 7A:
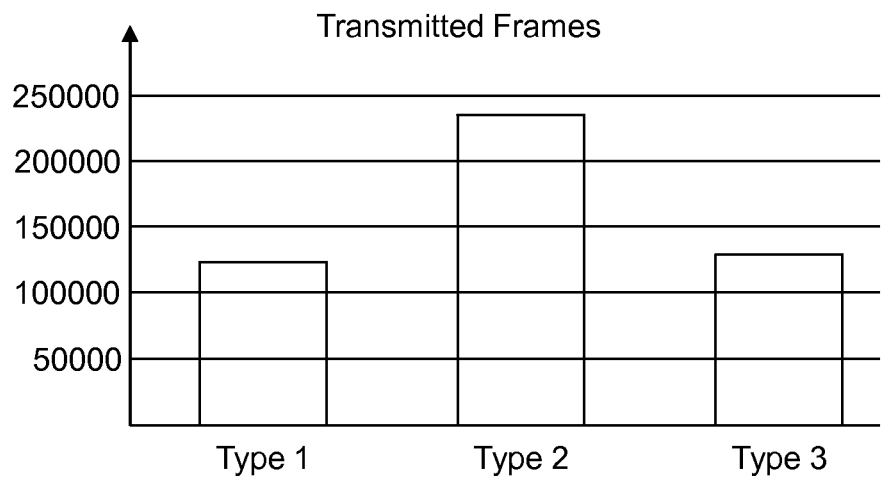
FIGS. 7A and 7B are bar graphs depicting simulated performance characteristics of a communication network implementing the method of FIG. 6, all arranged in accordance with at least some embodiments described herein.
Figure 7B:
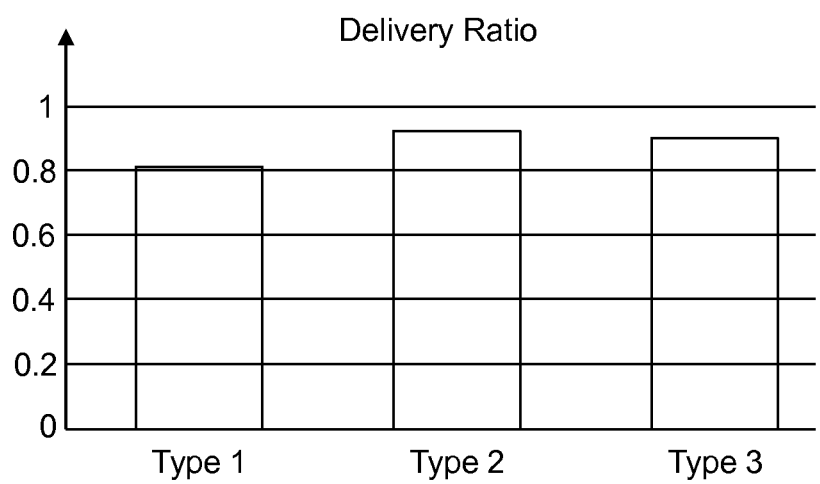

FIGS. 7A and 7B are bar graphs depicting simulated performance characteristics of a communication network implementing the method of FIG. 6, arranged in accordance with at least some embodiments described herein. The simulated performance characteristics of FIGS. 7A-7B were calculated using simulation software known as OMNEST for randomly placed, non-mobile nodes communicating over an IEEE 802.11 link layer, and data traffic sent from each of the nodes to one controller.

The simulated performance characteristics include transmitted frames in FIG. 7A and delivery ratio in FIG. 7B. The simulated performance characteristics are provided for three types of packet routing protocols, including standard IP forwarding, a multipath packet routing protocol as described in international patent publication WO 2011/013165 A1, and a multipath packet routing protocol as described herein. The foregoing packet routing protocols are designated in FIGS. 7A-7B as, respectively, Type 1, Type 2 and Type 3.

As illustrated in FIG. 7A, embodiments of the Type 3 multipath packet routing protocol described herein may substantially reduce a total number of transmitted frames, e.g., by identifying and dropping duplicate packets, as compared to the Type 2 multipath routing protocol, while only slightly increasing the total number of transmitted frames as compared to the Type 1 standard IP forwarding. As illustrated in FIG. 7B, a reliability, e.g., the delivery ratio, of embodiments of the Type 3 multipath packet routing protocol described herein may be similar to a reliability of the Type 2 multipath packet routing protocol, and substantially better than a reliability of the Type 1 standard IP forwarding.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of managing packets in a communication network including a plurality of communication nodes, the method comprising:
receiving a packet including a packet header, the packet header including a packet identifier uniquely identifying the packet and a traversal history configured to identify a set of communication nodes that have forwarded the packet;
determining a packet type of the packet received by a first communication node based on the packet identifier and the traversal history; and
dropping the packet when the packet is determined to be a duplicate packet; or
routing the packet to a neighbor communication node in a manner that prevents the packet from being caught in a loop when the packet is determined to be a returned packet or a new packet.

2. The method of claim 1, wherein the determining includes:
comparing the packet identifier to a list of packet identifiers corresponding to packets received at the first communication node;
determining whether another packet having a same packet identifier as the packet has been received at the first communication node based on the comparing; and
determining whether the first communication node has forwarded the packet based on the traversal history included in the packet header when it is determined that another packet having a same packet identifier as the packet has been received at the first communication node.

3. The method of claim 1, wherein the traversal history comprises a list or a Bloom filter.

4. The method of claim 1, wherein the routing comprises:
selecting a second communication node to which to forward the packet from a set of neighbor communication nodes of the first communication node;
determining whether the second communication node has forwarded the packet based on the traversal history included in the packet header; and
one of:
forwarding the packet to the second communication node when it is determined that the second communication node has not forwarded the packet; or
selecting an alternate neighbor communication node to which to forward the packet when it is determined that the second communication node has forwarded the packet.

5. The method of claim 1, wherein the determining comprises determining that the packet has not been received previously at the first communication node based on the packet identifier.

6. The method of claim 5, wherein the neighbor communication node comprises a first neighbor communication node, the method further comprising updating the traversal history included in the packet header to include a node identifier of the first communication node prior to forwarding the packet to the first neighbor communication node.

7. The method of claim 6, the method further comprising:
selecting a different neighbor communication node to which to forward the packet;
determining that the different neighbor communication node has forwarded the packet based on the traversal history;

selecting instead the first neighbor communication node to which to forward the packet in response to determining that the different neighbor communication node has forwarded the packet; and determining that the first neighbor communication node has not forwarded the packet based on the traversal history.

8. The method of claim 1, wherein the dropping comprises removing the duplicate packet from circulation within the communication network prior to the duplicate packet reaching a destination node specified in the packet header.

9. A system of managing packets in a communication network, the system comprising a plurality of communication nodes included in the communication network, each communication node comprising:

a processing device configured to manage packets in the communication network by:
determining a packet type of a packet received by a corresponding communication node based on a plurality of packet identifiers that correspond to packets received at the corresponding communication node, a packet identifier included in a packet header of the packet, and a traversal history included in the packet header of the packet;
updating the traversal history included in the packet header of the packet to include a node identifier of the corresponding communication node when the packet is determined to be a new packet; and
dropping the packet when the packet is determined to be a duplicate packet; or
routing the packet to a neighbor communication node in a manner that prevents the packet from being caught in a loop when the packet is determined to be a returned packet or a new packet.

10. The system of claim 9, wherein the determining includes:
comparing the packet identifier included in the packet header of the packet to the plurality of packet identifiers corresponding to packets received at the corresponding communication node;
determining whether another packet having a same packet identifier as the packet has been received at the corresponding communication node based on the comparing; and
determining whether the corresponding communication node has forwarded the packet based on the traversal history included in the packet header of the packet when it is determined that another packet having a same packet identifier as the packet has been received at the corresponding communication node.

11. The system of claim 9, wherein the routing comprises:
determining that the neighbor communication node has not forwarded the packet based on the traversal history included in the packet header; and
forwarding the packet to the neighbor communication node.

12. The system of claim 9, wherein the traversal history comprises a Bloom filter and wherein the processing device updating the traversal history comprises:
calculating k known hash functions associated with the Bloom filter over the node identifier of the corresponding communication node to determine k corresponding array positions in the Bloom filter; and
setting a bit in each of the k corresponding array positions in the Bloom filter to one when not already set to one.

13. The system of claim 9, wherein:
the corresponding communication node comprises a first communication node;
the traversal history comprises a list of node identifiers corresponding to communication nodes that have forwarded the packet; and
the processing device updating the traversal history comprises the processing device adding the node identifier of the first communication node to the list of node identifiers before forwarding the packet.

14. A non-transitory computer readable storage medium storing instructions to cause a communication node to perform operations for managing packets in a communication network including the communication node, the operations comprising:
receiving a packet including a packet header, the packet header including a packet identifier uniquely identifying the packet and a traversal history configured to identify a set of communication nodes that have forwarded the packet;
determining a packet type of the packet received by a first communication node based on the packet identifier and the traversal history; and
dropping the packet when the packet is determined to be a duplicate packet; or
routing the packet to a neighbor communication node in a manner that prevents the packet from being caught in a loop when the packet is determined to be a returned packet or a new packet.

15. The non-transitory computer readable storage medium of claim 14, wherein the traversal history comprises a Bloom filter and wherein the determining comprises determining that a node identifier of the communication node is absent from the Bloom filter when the packet is determined to be a duplicate packet, including:
calculating k known hash functions associated with the Bloom filter over the node identifier to determine k corresponding array positions in the Bloom filter;
checking whether the k corresponding array positions include a one bit or a zero bit; and
determining that the node identifier is absent from the Bloom filter when at least one of the k corresponding array positions includes a zero bit.

16. The non-transitory computer readable storage medium of claim 14, wherein:
the communication node comprises a first communication node;
the traversal history comprises a list of node identifiers corresponding to communication nodes that have forwarded the packet; and
the determining includes determining that a node identifier of the first communication node is absent from the list of node identifiers when the packet is determined to be a duplicate packet.

17. The non-transitory computer readable storage medium of claim 14, wherein the dropping comprises removing the duplicate packet from circulation within the communication network prior to the duplicate packet reaching a destination node specified in the packet header.

18. The non-transitory computer readable storage medium of claim 14, wherein the packet identifier includes at least one of: a unique sequence number assigned to the packet by a source of the packet; a timestamp indicating a departure time of the packet from the source, and a hash value.

19. The method of claim 3, wherein the traversal history comprises the Bloom filter and wherein the determining comprises determining that a node identifier of the communication node is absent from the Bloom filter when the packet is determined to be a duplicate packet, including:

calculating k known hash functions associated with the Bloom filter over the node identifier to determine k corresponding array positions in the Bloom filter;

checking whether the k corresponding array positions include a one bit or a zero bit; and determining that the node identifier is absent from the Bloom filter when at least one of the k corresponding array positions includes a zero bit.

20. The non-transitory computer readable storage medium of claim 14, wherein the routing comprises:

selecting a second communication node to which to forward the packet from a set of neighbor communication nodes of the first communication node;

determining whether the second communication node has forwarded the packet based on the traversal history included in the packet header; and one of:

forwarding the packet to the second communication node when it is determined that the second communication node has not forwarded the packet; or selecting an alternate neighbor communication node to which to forward the packet when it is determined that the second communication node has forwarded the packet.

\* \* \* \* \*